United States Patent [19]

Sato

[11] 4,303,807
[45] Dec. 1, 1981

[54] ULTRA-SMALL PORTABLE SOUND REPRODUCING APPARATUS

[75] Inventor: Masaaki Sato, Hachioji, Japan

[73] Assignee: Olympus Optical Co., Ltd., Tokyo, Japan

[21] Appl. No.: 84,190

[22] Filed: Oct. 12, 1979

[30] Foreign Application Priority Data

Oct. 18, 1978 [JP] Japan .................................. 53/128218
Oct. 18, 1978 [JP] Japan .................................. 53/128219
Oct. 18, 1978 [JP] Japan ............................. 53/143051[U]

[51] Int. Cl.$^3$ ........................ H04R 1/02; H04R 1/06; H04R 1/22
[52] U.S. Cl. .............................. 179/146 E; 179/1 E; 179/179; 181/155; 181/156
[58] Field of Search .............. 179/1 E, 146 R, 146 E, 179/179; 181/148, 155, 156, 198, 199

[56] References Cited

U.S. PATENT DOCUMENTS

| | | | |
|---|---|---|---|
| 1,710,035 | 4/1929 | Thompson | 181/199 |
| 1,958,888 | 5/1934 | Cromartie | 179/146 R |
| 3,180,447 | 4/1965 | Huff et al. | 181/145 |
| 3,521,010 | 7/1970 | Sato | 179/100.2 |
| 4,064,374 | 12/1977 | Sato | 179/100.11 |

FOREIGN PATENT DOCUMENTS

1370930 7/1964 France .............................. 179/1 E

OTHER PUBLICATIONS

RCA Review Mar. 1950, pp. 80–98 High-Efficiency Loud Speakers for Personal Radio Receivers, Olson et al.

*Primary Examiner*—George G. Stellar

[57] ABSTRACT

A loudspeaker holder including a baffle plate and a loudspeaker supported by the baffle plate is rotatably coupled to a portable sound reproducing device having an operating surface and an audio-amplifier for supplying a power output signal to the loudspeaker through a pin and opening coupling means. To utilize the loudspeaker, the loudspeaker holder is rotated about the pin to form a space between the baffle plate and the operating surface. The sounds generated by the loudspeaker are transmitted to the outside through the space and an opening provided in the baffle plate. In case of carrying the portable sound reproducing device, loudspeaker holder is rotated about the pin to bring the baffle plate into contact with the operating surface, and to extinguish the space.

10 Claims, 20 Drawing Figures

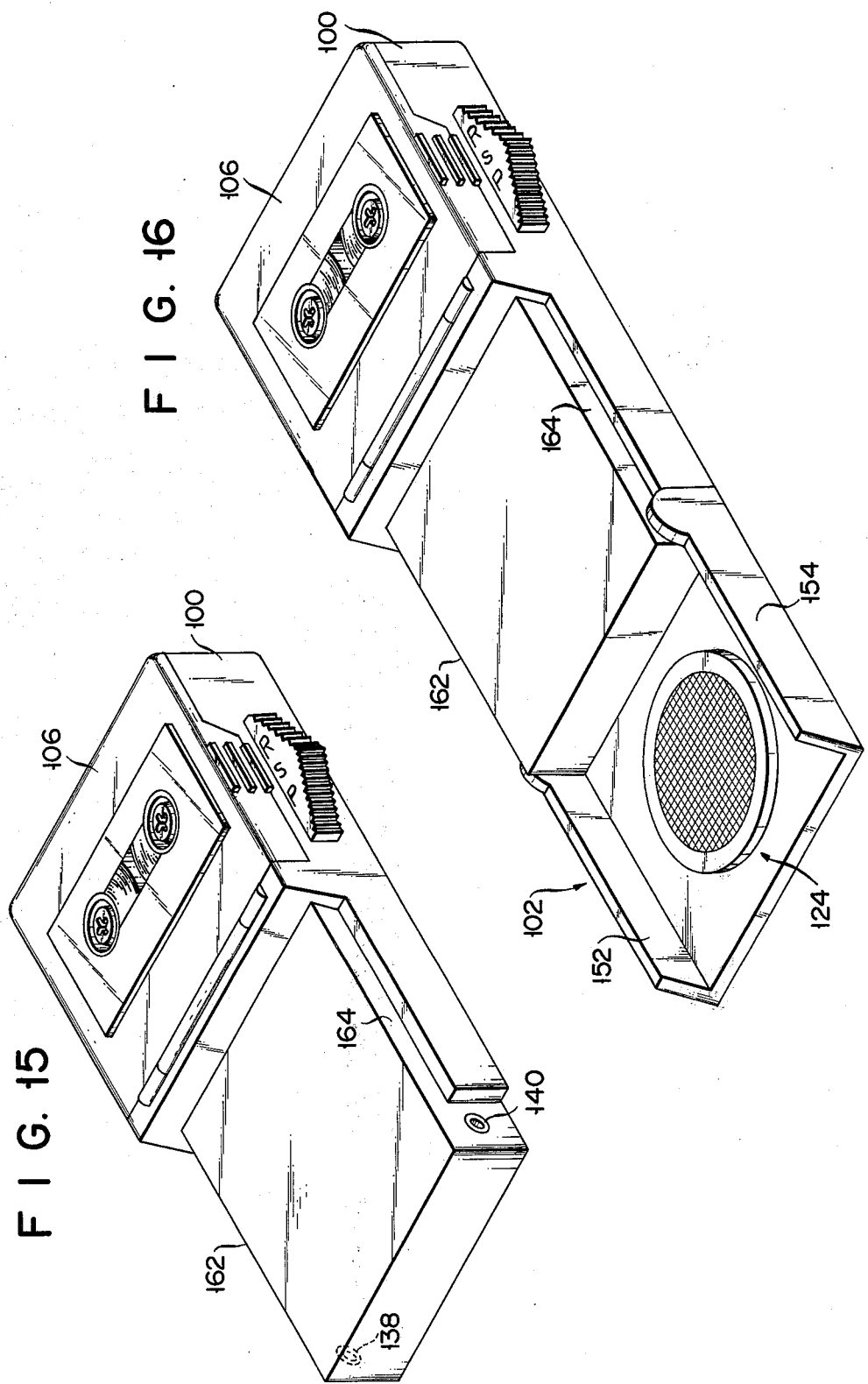

ULTRA-SMALL PORTABLE SOUND REPRODUCING APPARATUS

BACKGROUND OF THE INVENTION

This invention relates to a portable sound reproducing device provided with a loudspeaker holder that can reproduce high quality sounds.

In a portable sound reproducing device, for example a miniature portable cassette tape recorder or a miniature portable transistor radio having such small size that can be contained in a clothes pocket, as the size of the portable sound reproducing device becomes smaller it is necessary to densely arrange mechanical and electrical elements in the housing of the sound reproducing device. In such a case, since it is difficult to ensure a sufficient space on the rear side of a loudspeaker in the housing, the resistance of air to the movement of the loudspeaker increases thus preventing free movement of the same. More particularly, since the lowest resonance frequency $f_o$ of the loudspeaker increases, the limit of reproducing low frequency sounds also increases, thus failing to clearly reproduce the sound, in other words to reproduce sounds of high quality. For this reason, a sound reproducing device not utilizing a loudspeaker but the sound is reproduced only by an earphone is more compact and can reproduce clearer sound. However, users often forget to carry earphones with them or where a plurality of listeners want to listen to the reproduced sound, this type of sound reproducing device is of no use.

SUMMARY OF THE INVENTION

Accordingly, it is the principal object of this invention to provide an improved sound reproducing device which is compact and convenient to carry with and can reproduce sounds at high quality.

According to this invention, there is provided a portable sound reproducing device comprising a loudspeaker holder including a baffle plate, a portable sound reproducing device having an operating surface opposing the baffle plate and an audio-amplifier for providing a power output signal, a loudspeaker supported by the baffle plate and supplied with the power output signal to produce sounds, means for detachably connecting the loudspeaker holder to the portable sound reproducing device to contain the loudspeaker in a space between the baffle plate and the operating surface and means for transmitting the sounds generated by the loudspeaker in the space to outside.

BRIEF DESCRIPTION OF THE DRAWINGS

The above objects and advantages of the present invention can be more fully understood from the following detailed description taken in conjunction with the accompanying drawings, in which:

FIGS. 1 through 4 show a first embodiment of this invention in which FIG. 1 is a perspective view showing a loudspeaker holder as incorporated into the casing of a tape recorder;

FIG. 2 is a perspective view showing a loudspeaker holder alone;

FIG. 3 is a perspective view showing only the tape recorder; and

FIG. 4 is a wiring diagram showing the electrical connection of the tape recorder and the loudspeaker holder;

FIGS. 5, 6 and 7 show a second embodiment of this invention in which

FIG. 5 is a perspective view of a loudspeaker holder as incorporated into a tape recorder;

FIG. 6 is a perspective view showing only the loudspeaker holder; and

FIG. 7 is a perspective view showing only the tape recorder;

FIGS. 8 through 12 illustrate a third embodiment of this invention wherein

FIG. 8 is a perspective view showing a loudspeaker holder incorporated into a tape recorder to be portable;

FIG. 9 is a perspective view showing only the loudspeaker;

FIG. 10 is a perspective view showing only the tape recorder;

FIG. 11 is a sectional view taken along a line XI—XI shown in FIG. 8 and showing only the housing of the tape recorder and the loudspeaker holder; and FIG. 12 is a perspective view showing a manner of use of a loudspeaker of the loudspeaker holder incorporated into the tape recorder;

FIGS. 13 through 16 illustrate a fourth embodiment of this invention wherein

FIG. 13 is a perspective view showing a loudspeaker holder incorporated into a tape recorder to be carried therewith;

FIG. 14 is a perspective view showing only the loudspeaker holder;

FIG. 15 is a perspective view showing only the tape recorder; and

FIG. 16 shows a perspective view of a loudspeaker holder incorporated into the tape recorder, the loudspeaker holder being shown in a position of use; and FIGS. 17 through 20 illustrate a fifth embodiment of this invention in which FIG. 17 is a perspective view of a loudspeaker holder incorporated into a tape recorder to be portable;

FIG. 18 is a perspective view showing only the loudspeaker holder;

FIG. 19 is a perspective view showing only the tape recorder; and

FIG. 20 is a perspective view of a loudspeaker holder incorporated into the tape recorder, the loudspeaker holder being shown in a position of use.

DETAILED DESCRIPTION OF THE PREFERRED EMBODIMENTS

Figure 1:
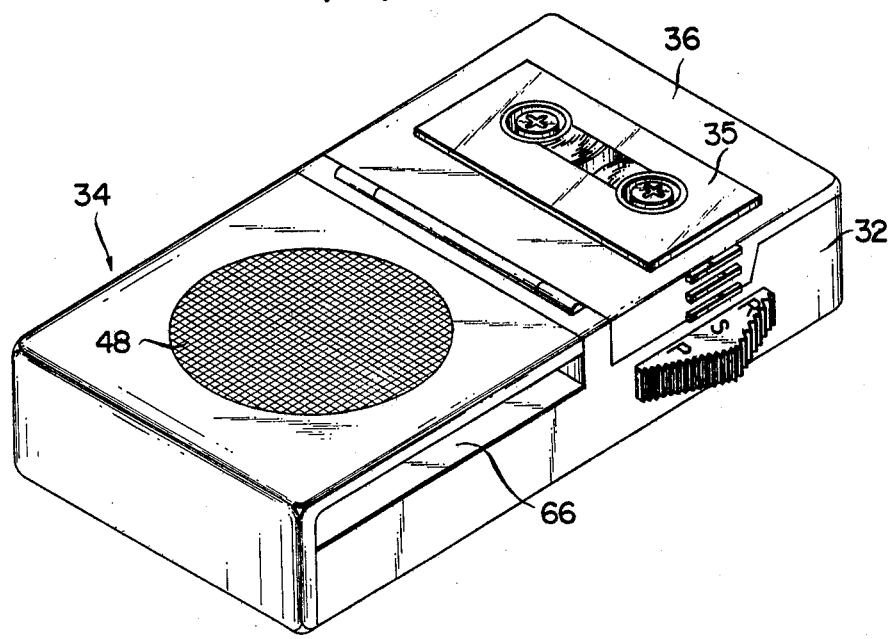

A portable sound reproducing device comprising the first embodiment of this invention and shown in FIG. 1 is a portable miniature cassette tape recorder having such small sized that can be contained in a pocket of clothes, for example. The portable miniature cassette tape recorder generally comprises a tape recorder 32 provided with an audio-amplifier and an earphone jack, not shown, and a loudspeaker holder 34 made of electro-nonconductive material, plastics for example, and having a hook shaped longitudinal sectional configuration.

Figure 2:
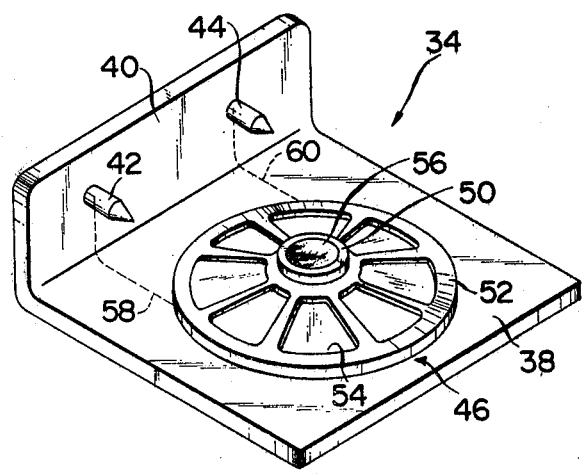

The tape recorder 32 is provided with a tape cassette mounting portion 35 at a portion of the upper surface, the tape cassette mounting portion 35 being equipped with reel shafts and covered by a tape cassette insertion cover 36. As best shown in FIG. 2, the loudspeaker holder 34 comprises a baffle plate 38 having the same size and area as a remaining portion (hereinafter called an operating surface) of the upper surface of the tape recorder 32, and a rear side plate 40 extending upwardly from the rear edge of the inner surface of the baffle plate 38, the rear side plate 40 being integral with the baffle plate 38. The rear side plate 40 has the same configuration as that of the rear side surface of the tape recorder 32, that is rectangular. The longitudinal length of the rear side plate 40 is equal to the width of the rear side surface, whereas the lateral length of the rear side plate 40 is slightly longer than the height of the rear side surface. More particularly, the distance between the upper end of the rear side plate 40 and the outer surface of the baffle plate 38, is made to be equal to the distance between the lower surface of the tape recorder 32 and the upper surface of the tape cassette insertion cover 36.

On the inner surface of the rear side plate 40 are secured a pair of spaced pins 42 and 44 made of electro-conductive material, for example iron, the pins 42, 44 extending inwardly in parallel with the inner surface of the baffle plate 38. A cone type loudspeaker 46 is secured to the inner surface of the baffle plate 38 with the front surface of the cone type loudspeaker 46 confronted to the inner surface, as shown in FIG. 1, an opening 48 having a diameter substantially the same as that of the cone type loudspeaker 46 is formed through the baffle plate 38 at a portion thereof facing the front surface of the cone type loudspeaker 46. Therefore, the sound produced by a front surface of the cone type loudspeaker 46 radiates through the opening 48 to the exterior space. The opening 48 is covered by a wire netting for preventing dust from entering into the cone type loudspeaker 46 and protecting the cone type loudspeaker 46 against external forces. The rear side of the cone type loudspeaker 46 is covered by a frame 52 having a yoke 50 and radial arms defining a plurality of openings 54 therebetween. A protector 56 made of a pliable material such as felt is bonded to the upper end surface of the yoke 50. Therefore, external bodies which will touch to the upper end surface of the yoke 50 will not be damaged by the upper end surface. The cone type loudspeaker 46 is electrically connected to the pins 42 and 44 through lead wires 58 and 60. When the loudspeaker holder 34 is molded from plastics, the lead wires 58 and 60 are embedded in the baffle plate 38 and the rear side plate 40 of the loudspeaker holder 34 not to be exposed.

Figure 3:
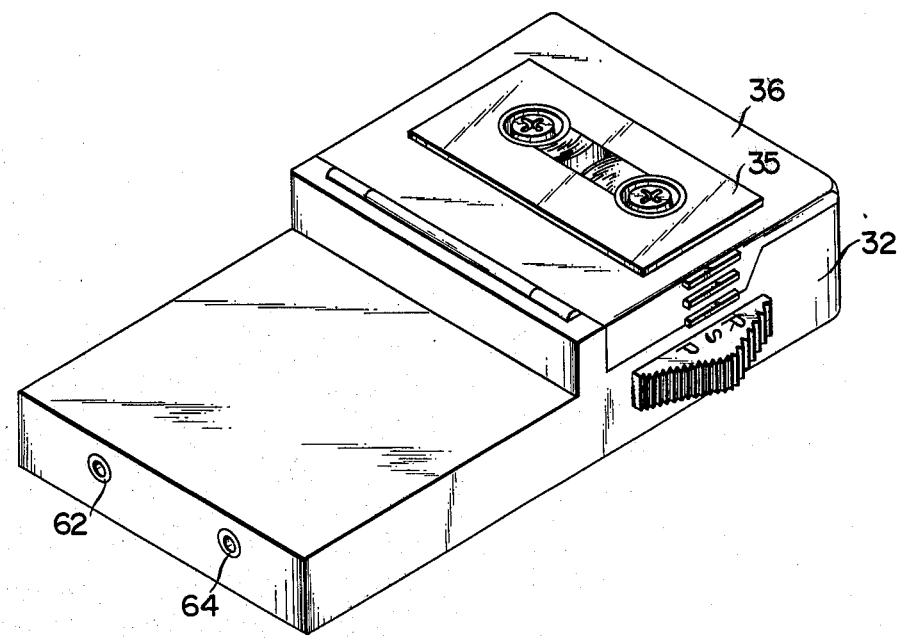

As shown in FIG. 3, a pair of openings are formed on the rear side surface of the tape recorder 32 to removably receive pins 42 and 44, the openings being provided with annular rings 62 and 64 made of electro-conductive material such as iron. These rings 62 and 64 are electrically connected to the audio-amplifier in the tape recorder 32.

To mount the loudspeaker holder 34 onto the tape recorder 32, the rear side surface of the tape recorder 32 is brought to oppose the inner surface of the rear side plate 40, and then the pins 42 and 44 are inserted into the openings and are electrically connected with the rings 62 and 64. This state is shown in FIG. 1. At this time, the protector 56 bonded to the upper end surface of yoke 50 of the loudspeaker 46 touches the operating surface of the tape recorder 32. Therefore, as shown in FIG. 1, a sound emitting opening 66 is formed between the operating surface of the tape recorder 32 and the inner surface of the baffle plate 38. The sound emitting opening 66 being communicated with the outside space on the left and right sides.

Figure 4:
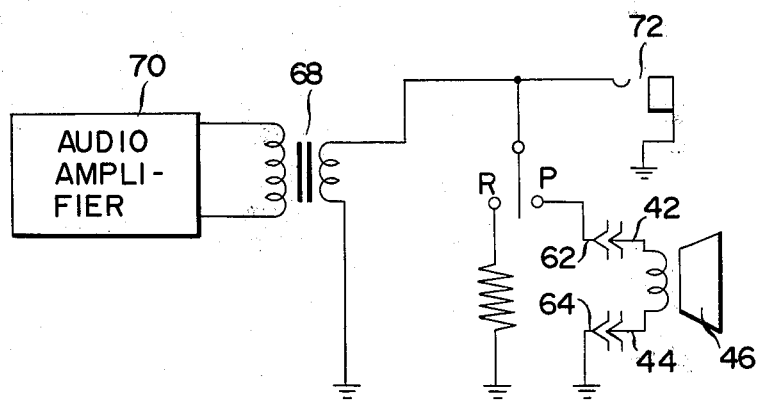

The wiring of the portable miniature cassette tape recorder of this embodiment is diagrammatically shown in FIG. 4. However, such wiring is well known in the art, it will be described briefly.

An output transformer 68 is connected to an audio-amplifier 70 of a well known construction. The power output produced by the output transformer 68 is sent to an earphone jack 72 and a recording/reproducing transfer switch. When the movable contact of this transfer switch 74 is thrown to a stationary contact P, the power output flows through rings 62, 64 and pins 42, 44 into the cone type loudspeaker 46, then the cone type loudspeaker 46 reproduce sounds.

Where the user desires to listen to sounds recorded in the above-mentioned portable miniature cassette tape recorder through the earphone, then he carries the tape recorder 32 with the loudspeaker 34 taken off, as shown in FIG. 3. Where the user desires to use the cone type loudspeaker 46, the loudspeaker holder 34 is connected to the tape recorder 32 through pins 42 and 44, and rings 62 and 64 as shown in FIG. 1. When used in this condition, the sounds that are generated by the rear surface of the cone type loudspeaker 46 would be emitted to the exterior space through the openings 54 and the sound emitting opening 66. Consequently, the lowest resonance frequency $f_o$ of the cone type loudspeaker 46 would not increase, thus enabling to clearly reproduce sound without increasing the limit of reproducing low frequency sounds. Moreover, inasmuch as the cone type loudspeaker 46 is secured to the baffle plate 38, the sounds generated by the front and rear surfaces of the cone and having opposite phases would be isolated from each other, so that the sounds generated by the front surface is radiated thus improving the quality of the reproduced sounds.

A second embodiment of this invention will now be described with reference to FIGS. 5, 6, and 7, in which elements corresponding to those of the first embodiment are designated by the same reference numerals.

Figure 5:
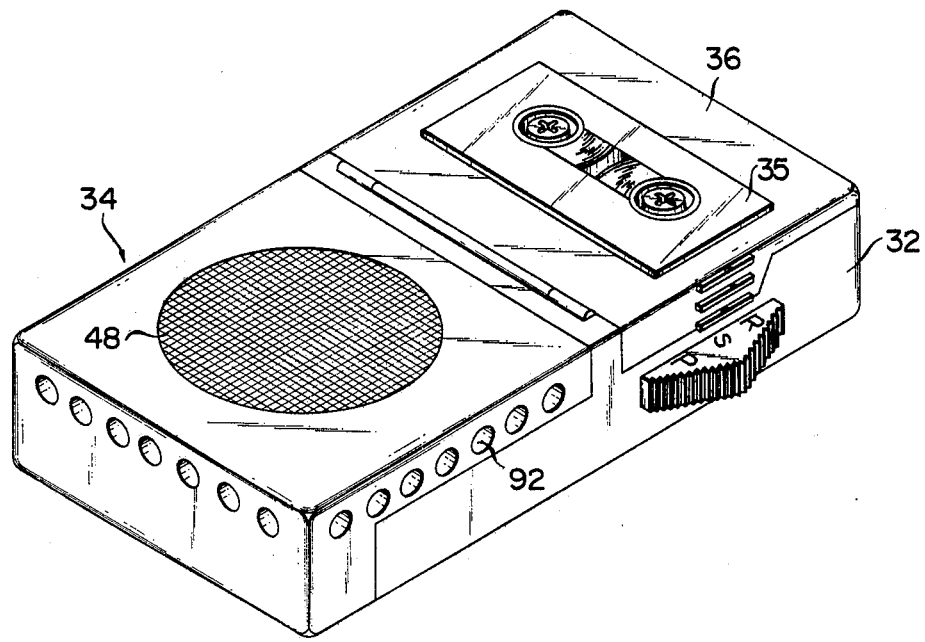
Figure 6:
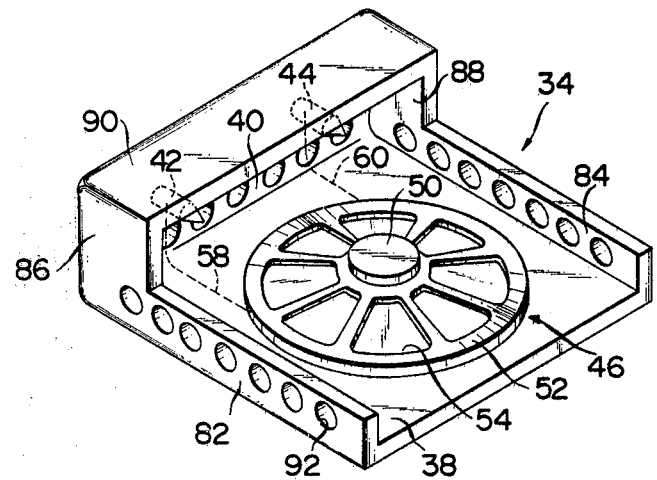

The modification shown in FIG. 5 takes the form of a portable miniature cassette tape recorder and as best shown in FIG. 6 comprises a baffle plate 38, rear side plate 40, and left and right upright side plates 82 and 84. Each of side plates 82 and 84 comprises a low portion having a height equal to the distance between the operating surface of the tape recorder 32 and the upper surface of the tape cassette insertion cover 36 and a high portion 86 (88) located on a each rear end of side plates 82 and 84 and having the same height as the rear side plate 40. The high portions 86 and 88 are integrally formed with the rear side plate 40. The upper ends of the high portions 86 and 88 are interconnected by a bridging member 90 with its rear side connected to the upper end of the rear side plate 40. A plurality of perforations 92 are formed through the left and right side plates 82 and 84 and through the base portion of the rear side plate 40.

Figure 7:
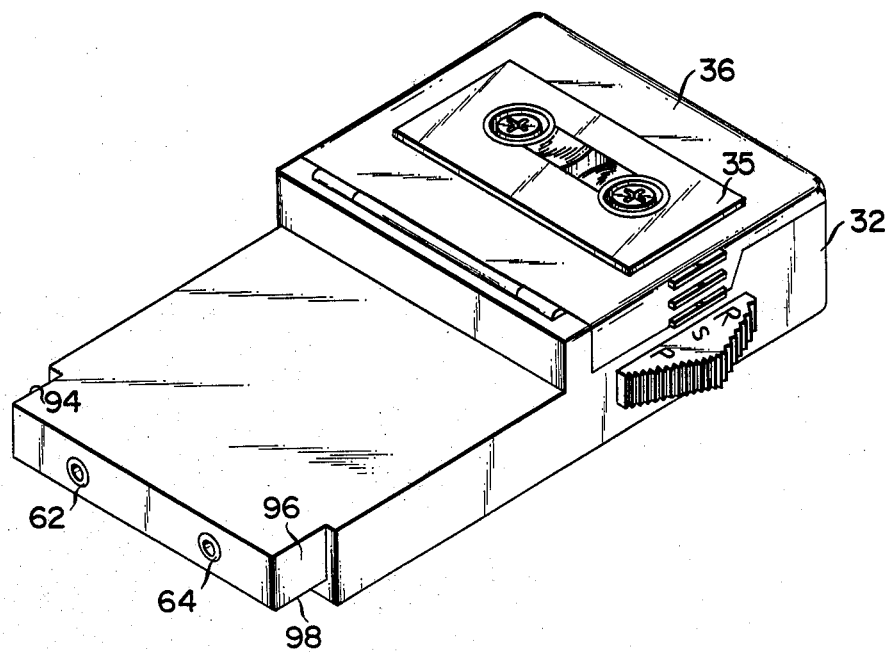

As shown in FIG. 7, notches 94, 96 and 98 are provided for the left and right side surfaces and the lower surface of the tape recorder 32 near the rear end thereof for engaging the high portions 86 and 88 and the bridging member 90 respectively. The depths of these notches are equal to the thicknesses of the high portions 86 and 88, and the bridging member 90 respectively.

To combine the tape recorder 32 with the loudspeaker holder 34, the rear side surface of the tape recorder 32 is brought to confront the inner surface of the rear side plate 40 of the loudspeaker holder 34 and then the pins 42 and 44 are inserted into the rings 62 and 64 as shown in FIG. 5. Under this state, the inner surface of the rear side plate 40 of the loudspeaker holder 34 is in direct contact with the rear side surface of the tape recorder 32, while the upper ends of the low portions of the loudspeaker holder 34 are in contact with the operating surface of the tape recorder 32. Then, the sound emitting space is defined between the operating surface and the inner surface of the baffle plate 38, and the sound emitting space is connected to the exterior space by the perforations 92. Since the high portions 86 and 88 of the loudspeaker holder 34 and the bridging member 90 clamp therebetween the rear end of the tape recorder 32, the loudspeaker holder 34 can be more firmly secured to the tape recorder 32 than in the first embodiment where the loudspeaker holder 34 is connected to the tape recorder 32 through only two pins 42 and 44. For this reason, the loudspeaker holder 34 wound not be disengaged from the tape recorder 32 by an accidental external force.

The electrical connection of this embodiment is identical to that of the first embodiment, so that it is believed unnecessary to describe it.

Where the user desires to listen to sounds recorded in the above-mentioned portable miniature cassette tape recorder through the earphone, then he carries the tape recorder 32 with the loudspeaker holder 34 taken off, as shown in FIG. 7. On the other hand, where the user desires to listen to sounds by using the cone type loudspeaker 46, the loudspeaker holder 34 is combined to the tape recorder 32 through pins 42 and 44, and rings 62 and 64 as shown in FIG. 5. The sounds generated by the rear surface of the cone type loudspeaker 46 would be emitted to the exterior space through the sound emitting space and the perforations 92. Consequently, the lowest resonance frequency $f_o$ and the limit of reproducing low frequency sounds do not increase, thus it is possible to clearly reproduce the sounds. The effect of the baffle plate 38 is the same as in the first embodiment.

Figure 8:
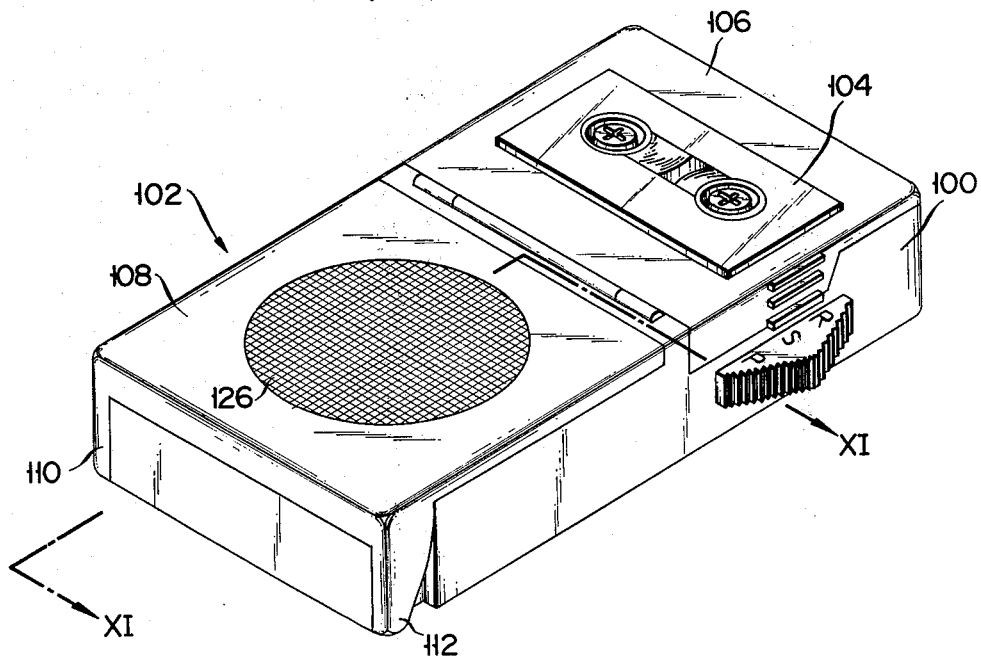

A third embodiment of this invention shown in FIG. 8 also takes the form of a portable miniature cassette tape recorder comprising a tape recorder 100 provided with an audio-amplifier and an earphone jack, not shown, and a loudspeaker holder 102 made of an electro-nonconductive material, plastic, for example.

Figure 9:
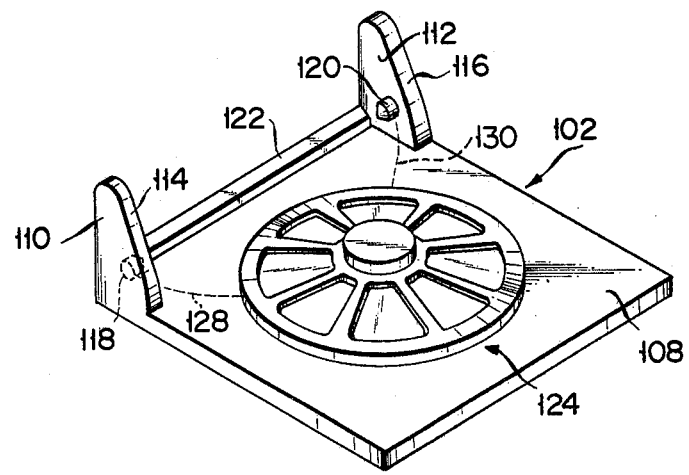

At one portion of the upper surface of the tape recorder 100 is provided with a tape cassette mounting portion 104 with reel shafts, and the tape cassette mounting portion 104 is covered by a tape cassette insertion cover 106. As best shown in FIG. 9, the loudspeaker holder 102 comprises a baffle plate 108 having the same size and area as a remaining portion (hereinafter called an operating surface) of the upper surface of the tape recorder 100 and tongue shaped portions (hereinafter called a tongue) 110 and 112 projecting upwardly from an inner surface of the baffle plate 108 at the rear ends of its right and left edges, the tongues 110 and 112 are integral with the baffle plate 108. The front side surfaces of the tongues are inclined from the top toward the bottom. A pair of stationary electro-conductive pins 118 and 120 are provided on the opposing side surfaces of the tongues 110 and 112 to extend in parallel with the inner surface of the baffle plate 108 and spaced from the inner surfaces, as viewed in FIG. 9. A rib 122 is formed integral with the rear edge of the inner surface of the baffle plate 108 with its opposite ends connected to the opposing side surface (hereinafter called an inner side surface) of the tongues.

A cone type loudspeaker 124 is secured to the inner surface of the baffle plate 108 with its front surface opposed to the inner surface of the baffle plate 108. An opening 126 having substantially the same diameter as the diameter of the cone type loudspeaker 124 is formed through a portion of the baffle plate 108 opposing the cone type loudspeaker 124 so as to transmit to the exterior space the sound generated by a front surface of the cone type loudspeaker 124. As before the opening 126 is covered by a wire netting for preventing dust from entering into the cone type loudspeaker 124 and protecting the cone type loudspeaker 124 against external forces. The cone type loudspeaker 124 is electrically connected to the pair of stationary pins 118 and 120 through lead wires 128 and 130. When the loudspeaker holder 102 is molded from plastics, the lead wires 128 and 130 are embedded in the baffle plate 108 and tongues 110 and 112 not to be exposed.

Figure 10:
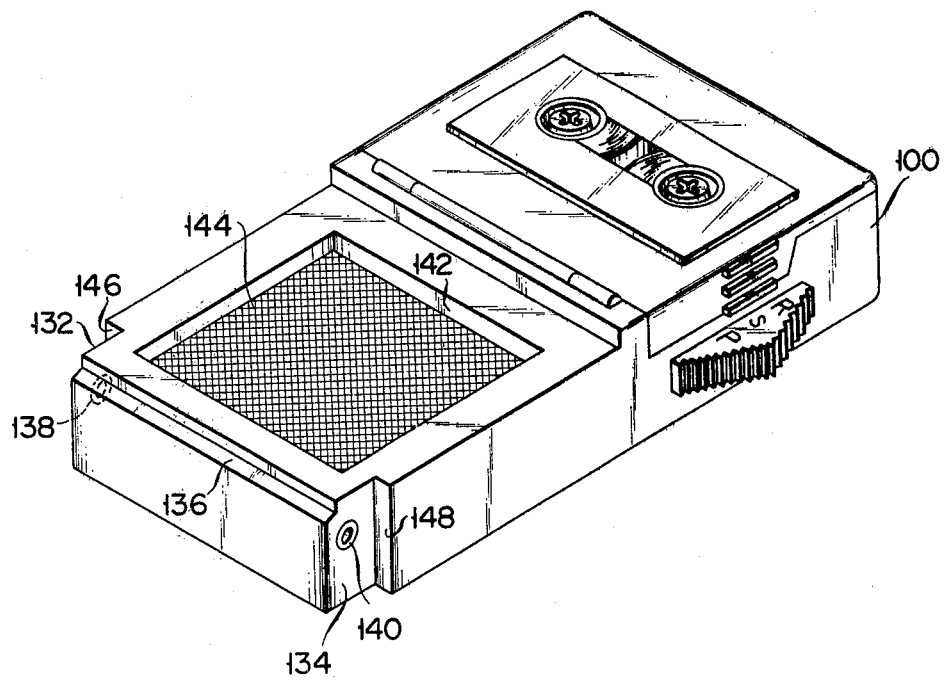

As shown in FIG. 10, rectangular notches 132 and 134 adapted to engage the tongues 110 and 112 are provided at the rear end of both side surfaces of the tape recorder 100. Furthermore, a transverse notch 136 is provided at the rear edge of the operating surface for receiving the rib 122 (see FIG. 9).

The notches 132 and 134 are provided with openings to detachably and rotatably receive the stationary pins 118 and 120, the openings being provided with annular rings 138, 140 made of electro-conductive material such as iron. These rings 138, 140 are electrically connected to the audio-amplifier contained in the tape recorder 100.

Figure 11:
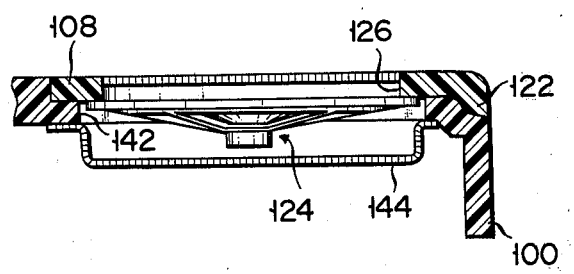

The operating surface of the tape recorder 100 is formed with an opening 142 for receiving portions of the cone type loudspeaker 124 which project from the inner surface of the baffle plate 108 such as the rear surface and yoke. As shown in FIGS. 10 and 11, the opening 142 extends through the housing of the tape recorder 100, and is covered by a wire netting 144 or a board for preventing dust from entering into an interior space of the housing. Besides, a recess can form the opening 142 in place of the opening which is extended through the housing, and a board can be used in place of the wire netting 144.

To mount the loudspeaker holder 102 on the tape recorder 100, the tongues 110 and 112 made of a plastics are flexed outwardly from each other to increase the spacing between stationary pins 118 and 120, and these stationary pins 118 and 120 are inserted into the rings 138 and 140 respectively.

The electrical connection of this embodiment will become the same as that shown in FIG. 4, if the annular rings 138 and 140 are substituted for the rings 62 and 64, and the stationary pins 118 and 120 are substituted for the pins 42 and 44, so that the electrical connection of this embodiment will not be described.

Figure 12:
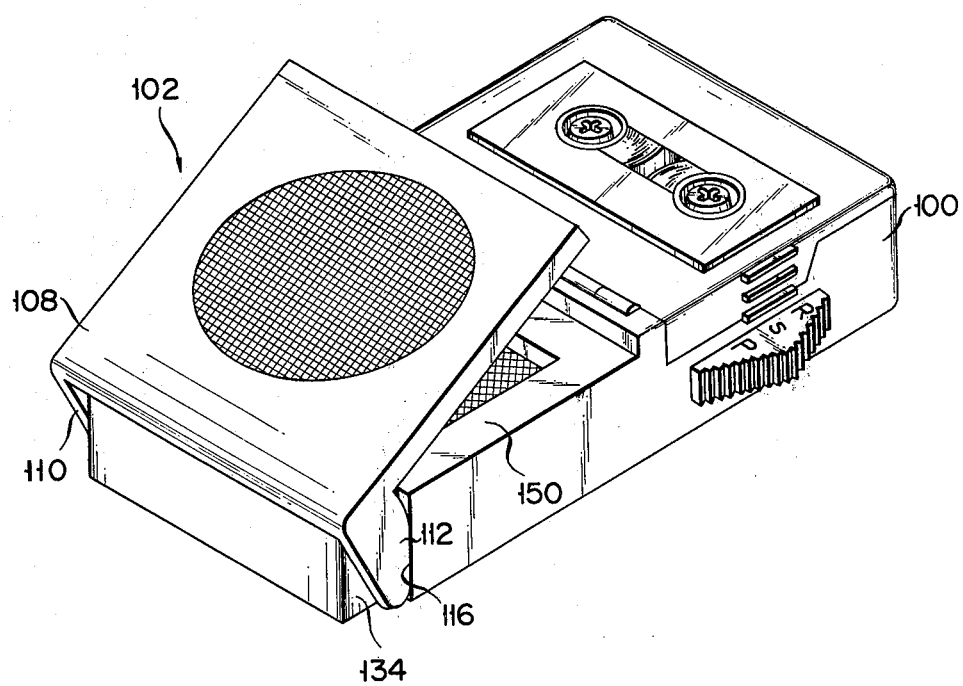

When using the portable miniature cassette tape recorder of this embodiment, where the user desires to listen to sounds recorded in the above-mentioned portable miniature cassette tape recorder through the earphone, then he carries the tape recorder 100 with the loudspeaker holder 102 taken off, as shown in FIG. 10. On the other hand, where the user desires to listen to sounds by using the loudspeaker 124, the pins of the loudspeaker holder 102 are inserted into rings 138 and 140 to rotatably mount the loudspeaker holder 102 on the tape recorder 100. Then, the loudspeaker holder 102 is rotated until its front side surfaces 114 and 116 touch the cutting surfaces 146 and 148 of the rectangular notches 132, 134 as shown in FIG. 12. When sounds are generated under these conditions, the sounds generated by the rear surface of the cone type loudspeaker 124 are emitted to the exterior space through a sound emitting space 150 defined between the inner surface of the baffle plate 108 and the operating surface of the tape recorder 100. For this reason, it is possible to clearly reproduce the sounds without increasing the lowest resonance frequency $f_o$ of the cone type loudspeaker 124 and the limit of reproducing low frequency sounds. The advantageous effect caused by the baffle plate 108 is also obtained in this embodiment.

When the tape recorder 100 is carried while the loudspeaker holder 102 is combined therewith, the loudspeaker holder 102 is rotated about stationary pins 118 and 120 to cause the inner surface of the baffle plate 108 to come into direct contact with the operating surface of the tape recorder 100 as shown in FIG. 8. At this time, the projecting portions of the loudspeaker 124 are contained in the opening 142 of the tape recorder 100 as shown in FIG. 11 so as not to prevent direct contact between the baffle plate 108 and the operating surface of the tape recorder 100. The rib 122 at the rear edge of the baffle plate 108 snugly fits in the notch 136 to prevent dust from entering into a space between the baffle plate 108 and the operating surface of the tape recorder 100.

When combined as shown in FIG. 8, the loudspeaker holder 102 and the tape recorder 100 form a compact integral assembly convenient to carry with.

Since the front side surfaces 114 and 116 of the tongues 110 and 112 are inclined, when the loudspeaker holder 102 is rotated as shown in FIG. 12 to define the sound emitting space 150 between the baffle plate 108 and the tape recorder 100, the rotation of the loudspeaker holder 102 is stopped when the inclined surfaces 114 and 116 engage the cutting surfaces 146 and 148 respectively so that it is possible to adjust the size of the space 150 so as to allow many listeners to listen to the sounds or music by mere adjustment of the inclination of the front side surfaces 114 and 116.

A fourth embodiment of the present invention will now be described with reference to FIGS. 13 through 16, in which portions corresponding to those shown in the third embodiment are designated by the same reference numerals.

Figure 14:
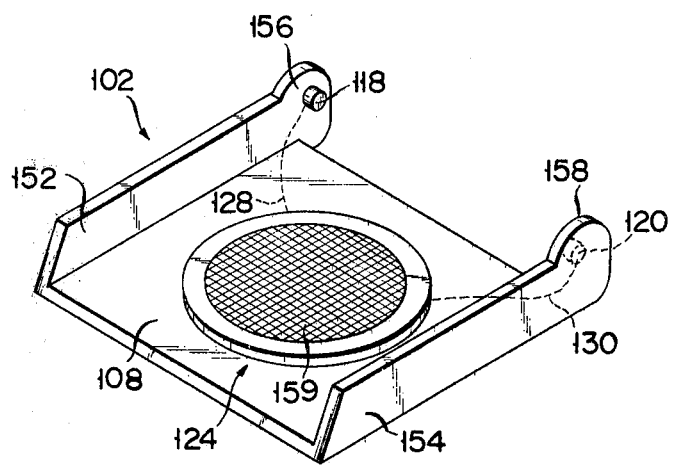
Figure 17:
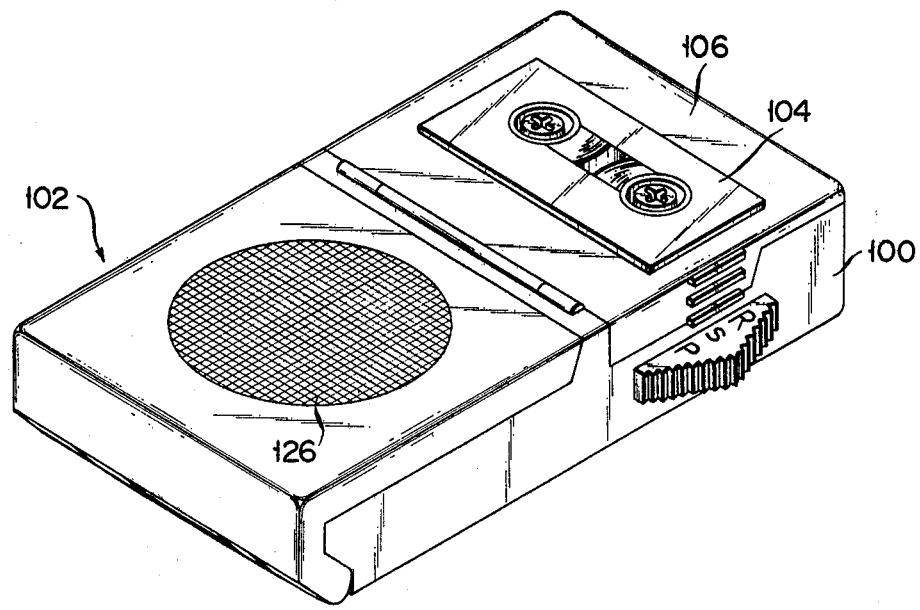
Figure 18:
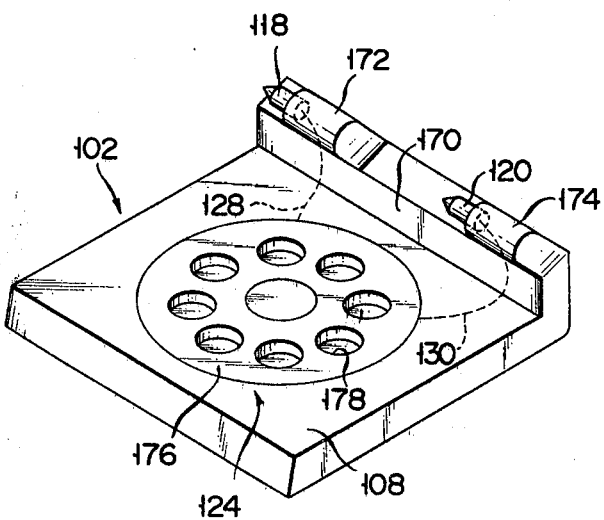

The portable miniature sound reproducing device shown in this modification takes the form of a portable miniature cassette tape recorder. As shown in FIG. 14, the loudspeaker holder 102 comprises a baffle plate 108 and upright side plates 152 and 154 at right and left side edges of the baffle plate 108, the side plates being formed integral with the baffle plate. At the rear ends of the side plates 152 and 154 are formed projections 156 and 158 having semicircular peripheral edges and opposing pins 118 and 120 on their inner surfaces.

Figure 13:
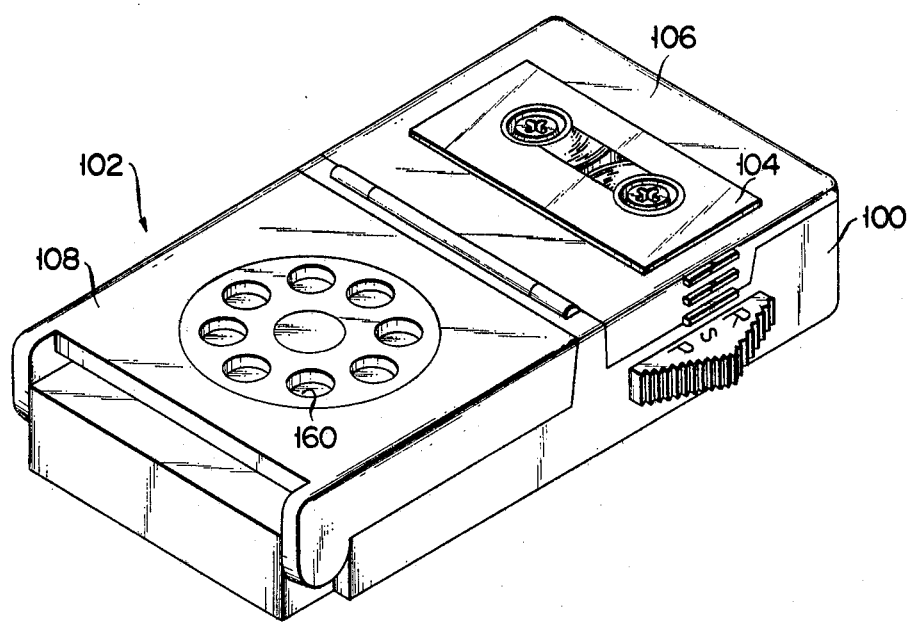

A cone type loudspeaker 124 is secured to the inner surface of the baffle plate 108 with the rear surface of the cone type loudspeaker 124 opposed to the inner surface of the baffle plate 108. The front surface of the loudspeaker 124 is covered by a dust preventing protective wire netting 159. As shown in FIG. 13, a plurality of perforations 160 on the same circle are provided through the baffle plate 108 at a portion thereof confronting the loudspeaker to transmit to the outside the sounds generated thereby.

As shown in FIG. 15, notches or shoulders 162 and 164 are provided for right and left side surfaces of the tape recorder 100 to receive the side plates 152 and 154 respectively. Rings 138 and 140 for rotatably receiving the pins 118 and 120 are mounted near the outer end of the side surfaces.

To combine the loudspeaker holder 102 with the tape recorder 100, the projections 156 and 158 of the loudspeaker holder 102 are bent outwardly to fit the pins 118 and 120 in rings 138 and 140 respectively.

The electrical connection of this modification is similar to that shown in FIG. 4. To listen to the sounds by using an earphone, the loudspeaker holder 102 is dismounted from the cassette tape recorder, whereas when the user desires to use the loudspeaker 124, the loudspeaker holder 102 is connected to the tape recorder 100 through the pins and rings described above. Then, the loudspeaker holder 102 is rotated counterclockwise to a position shown in FIG. 16 until the side plates 152 and 154 disengage the shoulders 162 and 164. Then the sounds generated by the rear surfaces of the loudspeaker 124 are transmitted to the outside through perforations 160 of the baffle plate 108. This construction also enables clear reproduction of the sounds without increasing the lowest resonance frequency $f_o$ and the limit of reproducing low frequency sounds.

Where the user desires to carry the tape recorder 100 together with the loudspeaker holder 102, the loudspeaker holder 102 is rotated about the pins 118 and 120 until the side plates 152 and 154 come to engage the shoulders 162 and 164, thus causing the wire netting 159 to contact with the operating surface of the tape recorder 100, the loudspeaker 124 is located in a space between the baffle plate 108 and the operating surface of the tape recorder. Thus an assembly convenient to carry and capable of protecting the loudspeaker 124 against external forces is achieved.

A fifth embodiment of this invention is shown in FIGS. 17 through 20 in which portions corresponding to those shown in the third embodiment. The loudspeaker holder 102 of the portable miniature cassette tape recorder of this modification comprises a baffle plate 108 and an integral upright rear side plate 170 at the rear edge thereof.

Spaced pin supports 172 and 174 are secured to the upper end of the rear side plate 170. The pins 118 and 120 are secured to the front (or left) ends of the pin supports to extend in parallel with the inner surface of the baffle plate 108, as viewed in FIG. 18.

The baffle plate 108 is provided with an opening 126 to receive the loudspeaker, the opening 126 being protected by a wire netting as before. The rear side of the opening 126 is closed with a cap 176 which is applied from the inner surface of the baffle plate 108, a rear surface of the cap 176 and the inner surface of the baffle plate 108 are arranged on the same plane. The cap 176 is provided with a plurality of perforations 178 arranged on the same circle. The loudspeaker is electrically connected to the pins 118 and 120 through lead wires 128 and 130 which are embedded in the molded loudspeaker holder 102.

Figure 19:
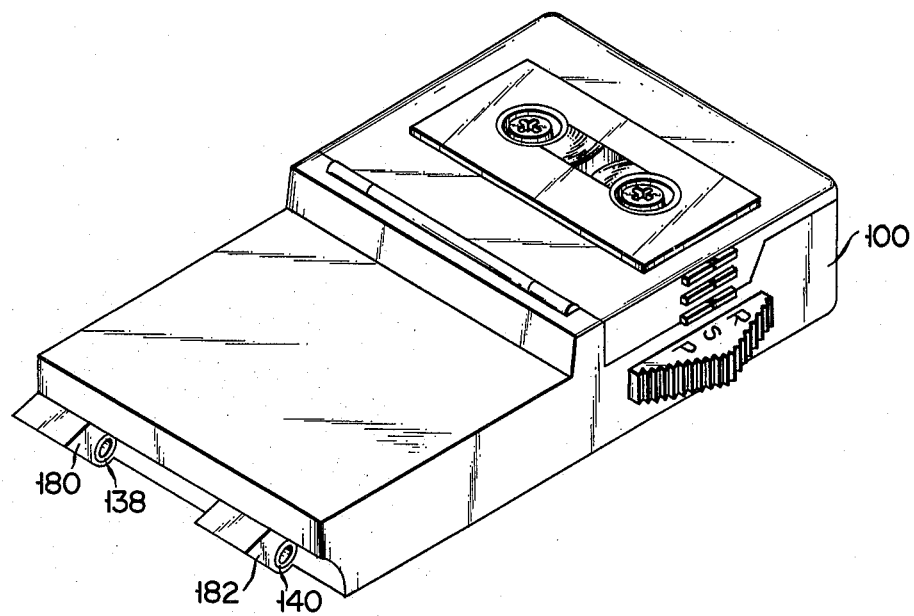

As shown in FIG. 19, the lower edge of the rear end surface of the tape recorder 100 is slanted to form a pair of spaced pin supports 180 and 182 which are provided with rings 138 and 140 for receiving pins 118 and 120. The electro-conductive annular rings are connected to the audio-amplifier in the tape recorder 100. The electric circuit of this modification is similar to that shown in FIG. 4.

Figure 20:
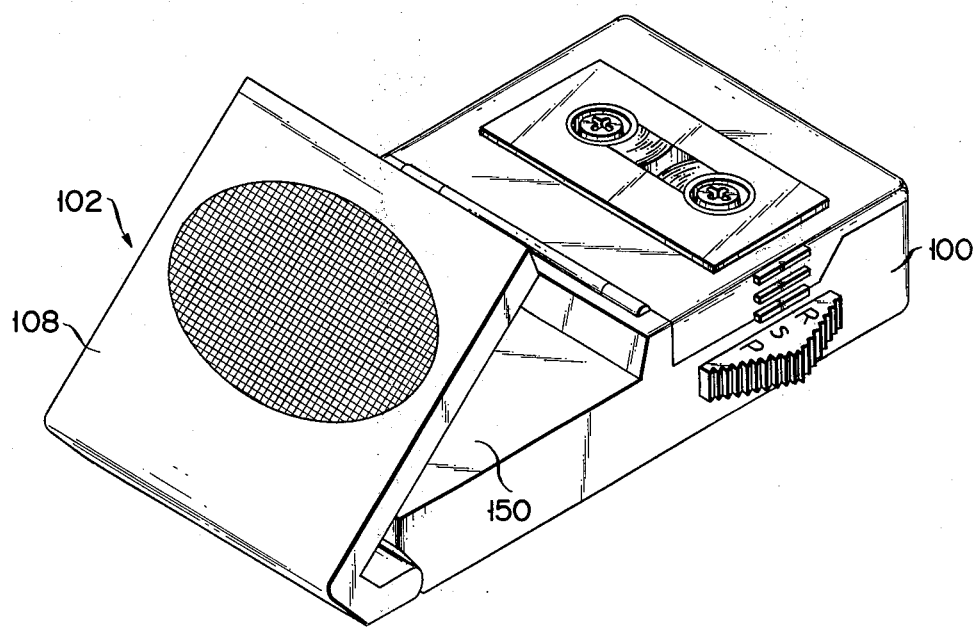

When the user desires to listen to the sounds by using an earphone, the loudspeaker holder 102 is removed from the tape recorder 100 as shown in FIG. 19, where the user desires to use the loudspeaker 124, the loudspeaker holder 102 is rotatably connected to the tape recorder 100 through pins 118 and 120. When the tape recorder 100 is mounted on a horizontal body, slant rear end surfaces of the pin supports 172 and 174 contact with the flat surface of the body, the loudspeaker holder 102 is held in an inclined position as shown in FIG. 20. The sounds generated by the rear surface of the loudspeaker 124 is transmitted to the outside through the perforations 178 and the sound emitting space 150 between the operating surface of the tape recorder 100 and the inner surface of the baffle plate 108, whereas the sounds generated by the front surface of the loudspeaker are transmitted to the exterior space through the opening 126. Again it is possible to reproduce clear sounds without increasing the lowest resonance frequency $f_o$ and the limit of reproducing low frequency sounds.

Where the user desires to carry with the tape recorder 100 together with the loudspeaker holder 102, the loudspeaker holder 102 is rotated counterclockwise about pins 118 and 120 to bring the inner surface of the baffle plate 108 into direct contact with the operating surface of the tape recorder 100, thus forming an compact unit convenient to carry.

In this embodiment, the coupling of the loudspeaker holder 102 to the tape recorder 100 is made by bringing the right hand ends of the pin supports 180 and 182 of the tape recorder to come to oppose the left hand ends of the pin supports 172 and 174 of the loudspeaker holder 102 and then moving the loudspeaker holder 102 to the left along the rear edge of the tape recorder, so that it is not necessary to flex outwardly the tongues 110 and 112 or projections 156 and 158 shown in the third or fourth embodiment, thus simplifying the mounting and dismounting of the loudspeaker holder 102.

Although in the first to fifth embodiments described above, the portable sound reproducing device was described in terms of a portable miniature cassette tape recorder it should be understood that cassette tape recorder may be of the type utilizing a so-called Philips type tape cassette or may be a portable miniature radio receiver.

Furthermore, the loudspeaker is not limited to the cone type but may be of any other this type, for example piezoelectric type.

Means for coupling together the tape recorder and the loudspeaker holder is not limited to pins and openings but can be substituted by any coupling means such as screws. Furthermore, instead of using electro-conductive pins and annular rings about the openings for receiving the pins, for interconnecting the audio-amplifier and the loudspeaker, any connecting may be used, for example cooperating contact pieces secured to the surfaces of the loudspeaker holder and of the tape recorder.

What is claimed is:

1. An ultra-small portable sound reproducing apparatus comprising:
   a loudspeaker holder including a baffle plate;
   a portable sound reproducing device having an operating surface opposing the baffle plate and an audio-amplifier for producing a power output signal;
   a loudspeaker supported on the baffle plate adapted to receive the power output signal to reproduce sounds; and
   connecting means for detachably connecting the loudspeaker holder to the sound reproducing device to permit the backside of the loudspeaker to face the operating surface and to define an opening for permitting the backside of the loudspeaker to communicate with the outside, said connecting means having an electroconductive pin secured to one of the loudspeaker holder and sound reproducing device and electrically connected to one of the loudspeaker and audio amplifer, and opening fitting means mounted on the other of the loudspeaker holder and portable sound reproducing device and provided with an electroconductive member which is electrically connected to the other of the loudspeaker and audio amplifier and is detachably fitted to the pin.

2. The ultra-small portable sound reproducing apparatus as defined in claim 1, in which said portable sound reproducing device has a circumferential surface intersecting said operating surface and having said opening fitting means, and the loudspeaker holder has a contacting wall contacting the circumferential surface and having a pin located at the shortest distance from an intersection of the contacting wall and the baffle plate as measured between the pin and said intersection, said shortest distance being longer than the shortest distance between the opening fitting means and the intersection between the circumferential surface and the operating surface.

3. The ultra-small portable sound reproducing apparatus as defined in claim 1, in which an electroconductive member of the opening fitting means is detachably fitted to the pin and rotatable to move the loudspeaker holder between a first position and a second position, and when the loudspeaker is to be used the loudspeaker holder is rotated to the first position wherein the baffle plate is moved away from the operating surface to form an opening for communicating the backside of the loudspeaker to the outside, and when the loudspeaker is not used the loudspeaker holder is rotated to the second position wherein said opening is closed.

4. The ultra-small portable sound reproducing apparatus as defined in claim 3, in which the portable sound reproducing device has a circumferential surface intersecting the operating surface and having one of the operating fitting means and pin, and the loudspeaker holder has a contacting wall to be contacted with the circumferential surface when the loudspeaker holder is located at the second position and to be moved away from the circumferential surface when the loudspeaker holder is located at the first position, said contacting wall having the other of the opening fitting means and pin.

5. The ultra-small portable sound reproducing apparatus as defined in claim 4, in which the contacting wall has a support surface to support the loudspeaker holder at the first position when the support surface is contacted with a plane on which the sound reproducing device is placed.

6. The ultra-small portable sound reproducing apparatus as defined in claim 3, in which said connecting means further includes a pin and opening fitting means, the sound reproducing device has a circumferential surface intersecting the operating surface and having a pair of sections which are parallel to each other and provided with one of a pair of pins and opening fitting means, and the loudspeaker holder has a pair of tongue-shaped portions elastically moved away from each other and contacting the pair of sections and provided with the other of the pair of pins and the opening fitting means.

7. The ultra-small portable sound reproducing apparatus as defined in claim 6, in which the circumferential surface has a stepped section and the pair of tongue-shaped portions has a supporting surface to support the loudspeaker holder at the first position when the support surface is contacted with the stepped section.

8. The ultra-small portable sound reproducing apparatus as defined in any one of claims 1 to 7, in which the backside of the loudspeaker projects from the baffle plate toward the operating surface, and the operating surface is provided with a recess for receiving the backside of the loudspeaker of the loudspeaker holder at the second position.

9. The ultra-small portable sound reproducing apparatus as defined in any one of claims 1 to 7, in which the sound reproducing device is a tape recorder.

10. The ultra-small portable sound reproducing apparatus as defined in claim 9, in which the tape recorder is adapted to receive a microcassette.

* * * * *